United States Patent
Spence

(10) Patent No.: US 10,073,958 B2
(45) Date of Patent: *Sep. 11, 2018

(54) SECURITY SYSTEM FOR VERIFICATION OF USER CREDENTIALS

(71) Applicant: ProfileCorrect LLC, Los Angeles, CA (US)

(72) Inventor: John Spence, Agoura Hills, CA (US)

(73) Assignee: ProfileCorrect LLC, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/614,088

(22) Filed: Jun. 5, 2017

(65) Prior Publication Data

US 2017/0270285 A1   Sep. 21, 2017

Related U.S. Application Data

(63) Continuation of application No. 14/616,174, filed on Feb. 6, 2015, now Pat. No. 9,672,336.

(60) Provisional application No. 62/044,122, filed on Aug. 29, 2014.

(51) Int. Cl.
*G06F 21/31* (2013.01)
*G06F 21/32* (2013.01)

(52) U.S. Cl.
CPC ............. *G06F 21/31* (2013.01); *G06F 21/32* (2013.01)

(58) Field of Classification Search
CPC ........................................... G06F 21/31–21/32
USPC ............................................ 726/5, 7, 27–29
See application file for complete search history.

(56) References Cited

U.S. PATENT DOCUMENTS

| | | | |
|---|---|---|---|
| 6,266,060 B1 | 7/2001 | Roth | |
| 7,433,832 B1 | 10/2008 | Bezos et al. | |
| 8,484,564 B1 | 7/2013 | Mari et al. | |
| 8,646,037 B2 | 2/2014 | Farsedakis | |
| 9,672,336 B1 * | 6/2017 | Spence | ................... G06F 21/31 |
| 2002/0083008 A1 | 6/2002 | Smith et al. | |
| 2005/0210282 A1 | 9/2005 | Ohmori | |
| 2008/0005282 A1 | 1/2008 | Gaedcke | |
| 2008/0140680 A1 | 6/2008 | Hyder et al. | |

(Continued)

FOREIGN PATENT DOCUMENTS

WO   WO 2014/094033   6/2014

OTHER PUBLICATIONS

Add-on Marketplace—customize your SocialEngine PHP website, http://www.socialengine.com/customize/se4/mod-page?mod_id=1305, Sep. 5, 2014.

(Continued)

*Primary Examiner* — Matthew T Henning
(74) *Attorney, Agent, or Firm* — Knobbe Martens Olson & Bear LLP

(57) ABSTRACT

A system enables network-based systems to confirm the identity of users and/or the authenticity of their credentials during their registration process by providing a database of verified users and various means for requesting and verifying user-provided information using the database. For example, the system may verify credentials and/or other aspects of the user and store such information in a database. The system may also generate badges that can be displayed on various content sites and that link to a summary of the user's verified information. The summaries may be customized for each content site at which the user has registered.

20 Claims, 11 Drawing Sheets

(56) References Cited

U.S. PATENT DOCUMENTS

| | | |
|---|---|---|
| 2009/0237850 A1 | 9/2009 | Wu et al. |
| 2010/0031331 A1 | 2/2010 | Ichinose et al. |
| 2010/0169363 A1 | 7/2010 | Gaedcke |
| 2011/0010757 A1 | 1/2011 | Tharakan |
| 2012/0089618 A1 | 4/2012 | Anschutz et al. |
| 2013/0275857 A1 | 10/2013 | Norwood et al. |
| 2013/0318005 A1 | 11/2013 | Bass et al. |
| 2016/0086236 A1* | 3/2016 | Viner ............... G06Q 20/40145 705/26.1 |

OTHER PUBLICATIONS

Airbnb Adds Identity Verification to End Anonymity in Sharing Economy, http://www.forbes.com/sites/tomiogeron/2013/04/30/airbnb-adds-identity-verification-in-big-step-for-sharing-economy/, Apr. 30, 2013.

Airbnb launches Verified Identification to help bring more accountability to the shared economy, http://thenextweb.com/insider/2013/04/30/airbnb-launches-verified-identification/, Apr. 30, 2013.

Eharmony Announces New Online ID Verification Service, http://onlinedatingpost.com/archives/2008/01/eharmony-announces-new-online-id-verification-service/, Sep. 5, 2014.

FAQs about verified accounts, https://support.twitter.com/articles/119135-faqs-about-verified-accounts#, retrieved on Aug. 29, 2014.

How to get verified account from twitter, https://dev.twitter.com/discussions/730, retrieved on Aug. 29, 2014.

Identity authentication with advertSAFE, www.advertsafe.com/authentication, Sep. 5, 2014.

Join Linkedin, https://ww.linkedin.com, retrieved on Aug. 29, 2014.

miiCard Product Update Oct. 2012, miiCard.com, Oct. 25, 2012.

Plugins Overview, https://developer.linkedin.com/plugins, retrieved on Aug. 29, 2014.

Sign Up for Free Professional Photography, https://www.airbnb.com/info/photography, retrieved on Aug. 29, 2014.

Solutions for your industry, https://www.relyid.com/solutions.html, Sep. 5, 2014.

Three ways to Use Identity Verification, www.advertsafe.com/article/three-ways-to-use-identity-verification.aspx#.VAm-C_m1YVq, Sep. 5, 2014.

Verify your Connect.Me® account for free, www.miiCard.com, Sep. 5, 2014.

What It's Like Being Verified on Twitter, http://dashes.com/anil/2013/03/what-its-like-being-verified-on-twitter.html, Mar. 1, 2013, retrieved on Aug. 29, 2014.

* cited by examiner

IDENTITY VERIFICATION  Credentials  Profiles  Settings  Contact

*Build Commentary*

Refer Site Name — Social Media Site ▼ — 410
Social Media User Name — [    ]

| Detail | Last Update | Commentary |
|---|---|---|
| ☐ John Doe | 03/19/2014 | Name matches member's license, passport, or gov't issued ID card. |
| ☐ 07/16/1968 | 02/15/2014 | Member's date of birth matches birth certificate. |
| ☐ Agoura Hills | 01/31/2014 | Member resides in CA |

(Submit)  (Cancel)

420 — Add Credential

IDENTITY VERIFICATION  Credentials  Profiles  Settings  Contact

Publish Commentary

| Refer Site Name | Name on Refer Site | Specify Viewable Information | Instructions |
|---|---|---|---|
| Online Dating #1 | John Doe | Edit / Enabled / Disabled / Delete | View Link |
| Classifieds | #pax52d1 | Edit / Enabled / Disabled / Delete | View Link |
| Social Media | John Doe | Edit / Enabled / Disabled / Delete | View Link |
| Other | John Doe | Edit / Enabled / Disabled / Delete | View Link |
| Online Dating #2 | jdoe | Edit / Enabled / Disabled / Delete | View Link |

SECURITY SYSTEM FOR VERIFICATION OF USER CREDENTIALS

CROSS-REFERENCE TO RELATED APPLICATIONS

This application is a continuation of U.S. patent application Ser. No. 14/616,174, entitled "SECURITY SYSTEM FOR VERIFICATION OF USER CREDENTIALS" and filed on Feb. 6, 2015, issued as U.S. Pat. No. 9,672,336, which claims priority under 35 U.S.C. § 119(e) to U.S. Provisional Application No. 62/044,122, entitled "SECURITY SYSTEM FOR VERIFICATION OF USER CREDENTIALS" and filed on Aug. 29, 2014, both of which are hereby incorporated by reference herein in their entireties.

BACKGROUND

There is an abundance of network-based systems (e.g., e-mail, dating, real estate, social media, gaming, and transaction sites) now accessible to users. In general, most of the network-based systems require users to register for system access. For example, registration may entail providing a username, a password, and an e-mail address. A registration confirmation message may be sent to the provided e-mail address and access to the network-based system may be granted once the user confirms the e-mail address.

SUMMARY

As described above, the registration process for most network-based systems includes providing a username, a password, and an email address. However, the registration process provides no mechanism for verifying the identity of a user or the authenticity of his or her credentials. This can be especially problematic because companies are under increasing pressure (from advertisers, financial analysts, other users, etc.) to verify that their users are legitimate. Accordingly, the systems and methods described herein may enable network-based systems to confirm the identity of users and/or the authenticity of their credentials during their registration process by providing a database of verified users and various means for requesting and verifying user-provided information using the database. For example, the system may verify credentials (e.g., degrees, diplomas, certifications, etc.) and/or other aspects of the user (e.g., name, address, age, gender, etc.) and store such information in a database. The system may also generate badges that can be displayed on various content sites (e.g., e-mail, dating, real estate, social media, gaming, transaction sites, etc.) and that link to a summary of the user's verified information.

The system may further allow users to individually select which information is available for viewing in the PROFILECOMMENTARY™ profile when a badge is selected. Furthermore, the user can customize the profile commentaries such that they display different information depending on whether a badge was selected on a first content site, on a second content site, and so on. For example, if a badge on a first content site is selected, the selecting entity may see verified educational information in the PROFILECOMMENTARY™ profile. However, if a badge on a second content site is selected, the selecting entity may see a verified name of the user, but no verified educational information.

One aspect of the disclosure provides a computing system configured to authenticate an identity of a user and to transfer securely verified information associated with the user. The computing system comprises a computer processor. The computing system further comprises a database storing a plurality of verified credentials associated with the user. The computing system further comprises a computer readable storage medium storing program instructions configured for execution by the computer processor in order to cause the computing system to: generate user interface data configured to render the interactive user interface on a computing device, the interactive user interface including an identification of a first content page, an identification of a second content page, an identification of a first verified credential in the plurality of verified credentials, and an identification of a second verified credential in the plurality of verified credentials, where the identification of the first content page, the identification of the second content page, the identification of the first verified credential, and the identification of the second verified credential are each selectable by the user; receive an identification of a selection by the user of the identification of the first content page and the identification of the first verified credential; receive an identification of a selection by the user of the identification of the second content page and the identification of the second verified credential; generate second user interface data configured to render a second interactive user interface, the second interactive user interface including an indication that the first verified credential is verified and not including information associated with the second verified credential; generate third user interface data configured to render a third interactive user interface, the third interactive user interface including an indication that the second verified credential is verified and not including information associated with the first verified credential; transmit, in response to a request from the first content page, the second user interface data to a second computing device; and transmit, in response to a request from the second content page, the third user interface data to the second computing device.

The computing system of the preceding paragraph can have any sub-combination of the following features: where the computer readable storage medium further stores program instructions that cause the computing system to: receive an identification of a selection by the user of the identification of the first content page and the identification of the second verified credential, and update the second user interface data such that the second interactive user interface includes the indication that the first verified credential is verified and the indication that the second verified credential is verified; where the first verified credential is a name of the user verified using a photo identification provided by the user; where the computer readable storage medium further stores program instructions that cause the computing system to: receive an identification of a selection by the user of the identification of the first content page and a de-selection by the user of the identification of the first verified credential, and update the second user interface data such that the second interactive user interface does not include the information associated with the first verified credential; where the computer readable storage medium further stores program instructions that cause the computing system to: receive an identification of a de-selection by the user of the identification of the first content page, and prevent, in response to a request from the first content page, transmission of the second user interface data; where the computer readable storage medium further stores program instructions that cause the computing system to determine whether the request from the first content page can be authenticated; where the computer readable storage medium further stores program instructions that cause the computing system to generate a hash value based on a value associated with the first content page, a time that the request from the first content page is received, and a shared key; where the request from the first content page comprises a second hash value, and where the computer readable storage medium further stores program instructions that cause the computing system to authenticate the request from the first content page if the hash value matches the second hash value; where the request from the first content page is transmitted using a security assertion markup language protocol; where the request from the first content page is transmitted using a secure sockets layer protocol; where the computer readable storage medium further stores program instructions that cause the computing system to: receive a user identification and password associated with the user, transmit the user interface data to the computing device in response to a determination that the user identification and the password are authenticated, store the user identification, and retrieve the user identification and perform operations using the user identification each time a request from the computing device is received; where the computer readable storage medium further stores program instructions that cause the computing system to transmit, in response to receiving an indication that a barcode was scanned by the second computing device, the second user interface data to a second computing device; and where the first content page is one of a page providing real estate information, a social media page, or an online dating page.

Another aspect of the disclosure provides a computer-implemented method of authenticating an identity of a user and transferring securely verified information associated with the user. The computer-implemented method comprises, by execution of program instructions by one or more computing devices, generating user interface data configured to render the interactive user interface on a computing device, the interactive user interface including an identification of a first content page, an identification of a first verified credential in the plurality of verified credentials, and an identification of a second verified credential in the plurality of verified credentials, where the identification of the first content page, the identification of the first verified credential, and the identification of the second verified credential are each selectable by the user; receiving a representation of a selection by the user of the identification of the first content page and the identification of the first verified credential; generating second user interface data configured to render a second interactive user interface, the second interactive user interface including an indication that the first verified credential is verified and not including information associated with the second verified credential; and transmitting, in response to a request from the first content page, the second user interface data to a second computing device.

The method of the preceding paragraph can have any sub-combination of the following features: where the interactive user interface further includes an identification of a second content page, the computer-implemented method further comprising: receiving an identification of a selection by the user of the identification of the second content page and the identification of the second verified credential, generating third user interface data configured to render a third interactive user interface, the third interactive user interface including an indication that the second verified credential is verified and not including information associated with the first verified credential, and transmitting, in response to a request from the second content page, the third user interface data to the second computing device; where the method further comprises: receiving an identification of a selection by the user of the identification of the first content page and the identification of the second verified credential, and updating the second user interface data such that the second interactive user interface includes the indication that the first verified credential is verified and the indication that the second verified credential is verified; where the first verified credential is a name of the user verified using a photo identification provided by the user; where the method further comprises receiving an identification of a selection by the user of the identification of the first content page and a de-selection by the user of the identification of the first verified credential, and updating the second user interface data such that the second interactive user interface does not include the information associated with the first verified credential; where the method further comprises determining whether the request from the first content page can be authenticated; and where determining whether the request from the first content page can be authenticated further comprises generating a hash value based on a value associated with the first content page, a time that the request from the first content page is received, and a shared key.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIG. 4 illustrates an example interactive user interface that may be generated by the PROFILECORRECT™ system, in which a user may select what information related to the user may be shown in a badge or when a badge is selected by other users.

FIG. 5 illustrates an interactive user interface that enables a user to completely enable, disable, edit, and/or delete a PROFILECOMMENTARY™ profile for a particular content site.

DETAILED DESCRIPTION

Introduction

Figure 1:
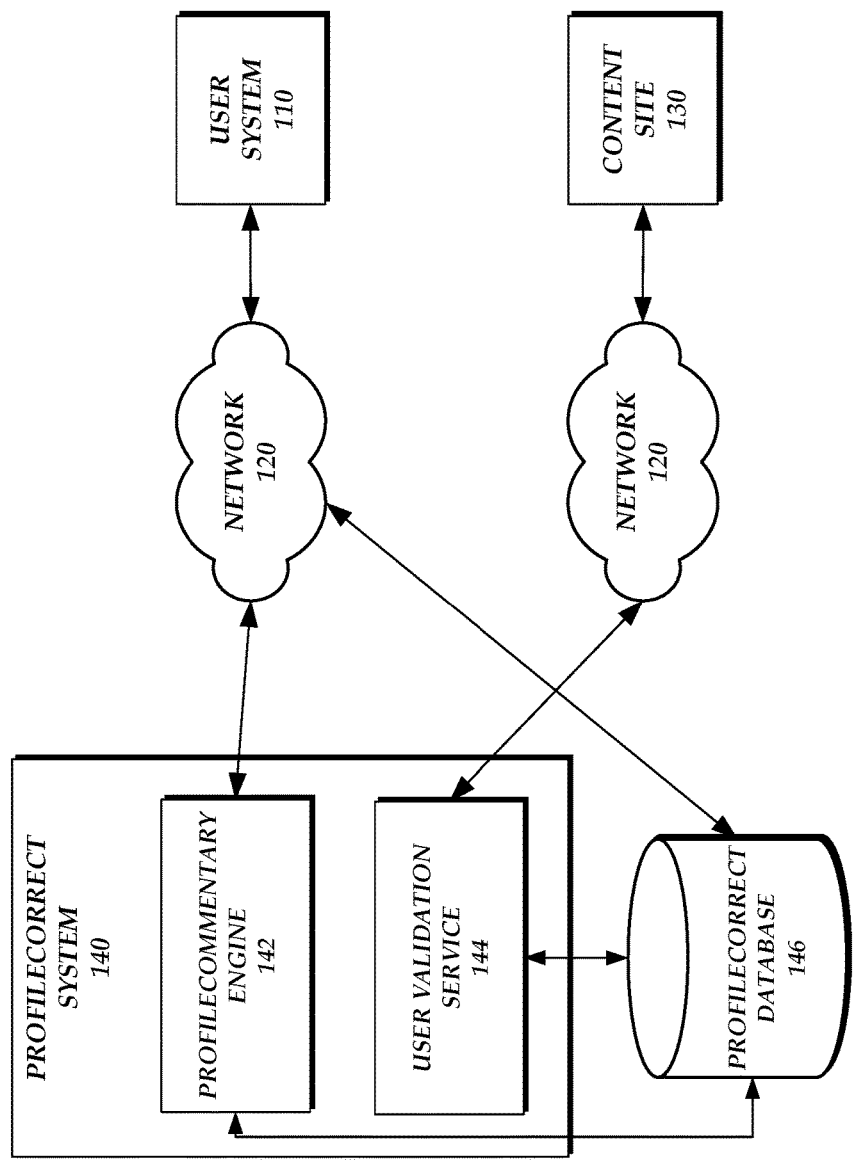
FIG. 1 illustrates a user verification environment with a PROFILECORRECT™ system that enables any user to submit credentials for verification and that supplies an indication of the user's verification to any content site so that the content site can output an indication of such verification to its users.

As described above, the registration process for most network-based systems includes providing a username, a password, and an email address. In addition, the network-based systems may ask a user to confirm information about himself or herself, such as that the user is older than a certain age. However, the registration processes of these network-based systems do a poor job of confirming user identity. For example, e-mail addresses are widely available and can be created anonymously. Even if the network-based system requests the user's name and/or mailing address, there is no system in place to verify that the entered information is valid. This can be especially problematic because companies are under increasing pressure (from advertisers, financial analysts, other users, etc.) to verify that their users are legitimate.

Accordingly, the systems and methods described herein may enable network-based systems to confirm the identity of users and/or the authenticity of their credentials during their registration process by providing a database of verified users and various means for requesting and verifying user-provided information using the database. For example, the system may verify credentials (e.g., degrees, diplomas, certifications, etc.) and/or other aspects of the user (e.g., name, address, age, gender, etc.) and store such information in a database. The system may also generate badges that can be displayed on various content sites (e.g., e-mail, dating, real estate, social media, gaming, transaction sites, etc.) and that link to a summary of the user's verified information. As used herein, a "badge" is a selectable graphic, message, or other data form that is associated with a user and that may be displayed in a profile created by the user at one or more content sites. A badge may be a link that, when selected, redirects the selecting entity (e.g., another user of the content site) to a page that displays an indication of what user credentials and/or other aspects of the user have been verified. The collection of this information may be referred to as a "PROFILECOMMENTARY™ profile."

The system may further allow users to individually select which information is available for viewing in the PROFILECOMMENTARY™ profile when a badge is selected. Furthermore, the user can customize the profile commentaries such that they display different information depending on whether a badge was selected on a first content site, on a second content site, and so on. For example, if a badge on a first content site is selected, the selecting entity may see verified educational information in the PROFILECOMMENTARY™ profile. However, if a badge on a second content site is selected, the selecting entity may see a verified name of the user, but no verified educational information.

The system may include various authentication and security mechanisms to ensure that data communicated between the user, the system, and the content sites is secure and to prevent the unauthorized transmission of data. The system may further implement load balancing techniques to reduce the load on any given component of the system and to reduce the latency experienced by the user when transmitting documentation for validation, customizing a PROFILECOMMENTARY™ profile, and/or viewing a PROFILECOMMENTARY™ profile after selecting a badge.

System Components

FIG. 1 illustrates a user verification environment with a PROFILECORRECT™ system 140 that enables any user to submit credentials for verification and that supplies an indication of the user's verification to any content site so that the content site can output an indication of such verification to its users. The user verification environment in FIG. 1 includes various user systems 110, various content sites 130, the PROFILECORRECT™ system 140, and a PROFILECORRECT™ database 146. As will be appreciated by those of skill in the relevant art, the user verification environment may include any number of distinct user systems 110 and/or content sites 130. The system components may communicate with each other via one or more communication networks 120. The network 120 may be a publicly accessible network of linked networks, possibly operated by various distinct parties, such as the Internet. In other embodiments, the network 120 may include a private network, personal area network, local area network, wide area network, cable network, satellite network, cellular telephone network, etc. or combination thereof, each with access to and/or from the Internet.

The user systems 110 can include a wide variety of computing devices operated by users, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. Individual user systems 110 may execute a browser application to communicate via the network 120 with other computing systems in order to verify user credentials and view other verified user credentials.

The content sites 130 may be network-based systems that host a variety of content. For example, the content sites 130 may be e-mail, dating, real estate, social media, gaming, and/or transaction sites. The content sites 130 may allow users to create profiles and, in some embodiments, the profiles are viewable by other users of the site. The content sites 130 can correspond to logical associations of one or more computing devices for hosting content and servicing requests for the hosted content over the network 120. For example, a content site 130 can include a web server component corresponding to one or more server computing devices for obtaining and processing requests for content (such as content pages) from user systems 110 or other devices or service providers. The content site 130 may communicate with the PROFILECORRECT™ system 140 to receive a verification of user credentials and provide such verification to users that access the content site 130.

The PROFILECORRECT™ system 140 can be a computing system configured to (1) receive credentials from users, (2) verify the authenticity of users and their credentials, (3) generate messages indicating the credentials that are verified, (4) provide information to content sites 130 verifying user credentials, and (5) allow users to select what verified credentials are publicly viewable (e.g., by allowing the management of what content is provided in badges or profile commentaries). For example, the PROFILECORRECT™ system 140 can be a physical server or group of physical servers that may be accessed via the network 120. In some embodiments, the PROFILECORRECT™ system 140 includes a web server, a servlet container, and application server and/or one or more databases that implement the operations described herein. In some instances, the PROFI- LECORRECT™ system 140 includes a plurality of application servers (e.g., 5, 10, 15, etc.) for load balancing purposes, where each of the application servers may communicate with the same database, such as the PROFILECORRECT™ database 146. For example, if one application server has a high volume of traffic, a user system 110 or a content site 130 may be redirected to another application server that has a lower volume of traffic. However, once a user system 110 or a content site 130 has begun communicating with an application server, the user system 110 or the content site 130 may continue to communicate with the same application server until the session expires. The PROFILECORRECT system 140 may also implement a variety of security and authentication features, which are described in greater detail below with respect to FIGS. 2A-2B.

The PROFILECORRECT™ system 140 may include various modules, components, data stores, and the like to provide the user verification functionality described herein. For example, the PROFILECORRECT™ system 140 may include a PROFILECOMMENTARY™ engine 142 that allows users, via the user systems 110, to submit credentials for verification and to manage a user profile (e.g., selecting which verified credentials are publicly viewable by other users via badges or profile commentaries). The PROFILECOMMENTARY™ engine 142 may verify the authenticity of a user and his or her credentials (e.g., by providing credentials to an administrator user for verification) and store the verified user credentials in the PROFILECORRECT™ database 146. The PROFILECOMMENTARY™ engine 142 is described in greater detail below with respect to FIGS. 2A-2B.

The PROFILECORRECT™ system 140 may also include a user validation service 144. The user validation service 144 may receive a request to verify a user's identity and/or credentials from a content site 130 and provide a confirmation to the content site 130 if the user's identity and/or credentials can be verified. The user validation service 144 may communicate with the PROFILECORRECT™ database 146 to determine whether a user's identity and/or credentials are verified. The user validation service 144 is described in greater detail below with respect to FIGS. 2A-2B.

The PROFILECORRECT™ system 140 may include additional modules, components, data stores, and the like to provide the features described above and in greater detail below. For example, the PROFILECORRECT™ system 140 may include a cache that stores verified user credentials or profile commentaries. Information may be stored in the cache when a content site 130 requests verification of a user's credentials and verified user credentials are retrieved from the PROFILECORRECT™ database 146. Information may also be stored in the cache when users of the content sites 130 select badges that redirect the users to various profile commentaries. Thus, if multiple content sites 130 request verification of the same user's credentials, the cache can be utilized to provide quickly a positive (or negative) acknowledgment. Likewise, if multiple users are selecting the same badge on the same content site 130, the cache can be utilized to display quickly the appropriate PROFILECOMMENTARY™ profile.

The PROFILECORRECT™ database 146 may store user information, such as a user profile and usernames, passwords, and/or verified user credentials associated with the user profile. The PROFILECORRECT™ database 146 may be implemented as any type of database, such as a MYSQL database. While the PROFILECORRECT™ database 146 is illustrated as being external to the PROFILECORRECT™ system 140 (e.g., a separate data store hosted by a separate device, a data store associated with a user system 110, a data store associated with a content site 130, etc.), this is not meant to be limiting. The PROFILECORRECT™ database 146 may be a data store that is internal to the PROFILECORRECT™ system 140.

The PROFILECORRECT™ system 140 may be a single computing device, or it may include multiple distinct computing devices, such as computer servers, logically or physically grouped together to collectively operate as a server system. The components of the PROFILECORRECT™ system 140 can each be implemented in application-specific hardware (e.g., a server computing device with one or more ASICs) such that no software is necessary, or as a combination of hardware and software. In addition, the modules and components of the PROFILECORRECT™ system 140 can be combined on one server computing device or separated individually or into groups on several server computing devices. In some embodiments, the PROFILECORRECT™ system 140 may include additional or fewer components than illustrated in FIG. 1.

In some embodiments, the features and services provided by the PROFILECORRECT™ system 140 may be implemented as web services (e.g., RESTful web services) consumable via the communication network 120. In further embodiments, the PROFILECORRECT™ system 140 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

Example Processes for Performing User Verification

Figure 2A:
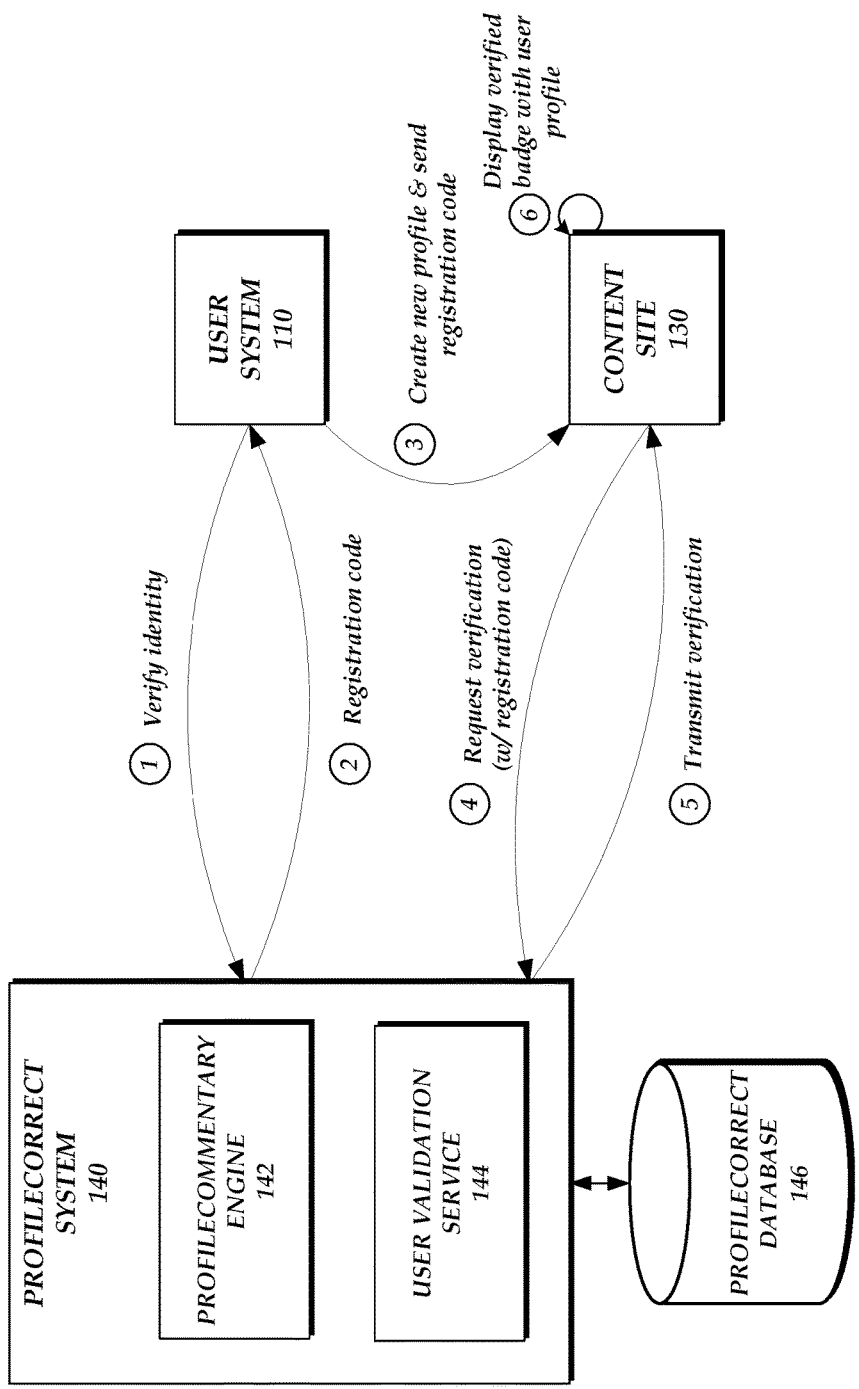
FIG. 2A illustrates an example process for performing user verification.

FIG. 2A illustrates an example process for performing user verification. At step one, a user using the user system 110 verifies his or her identity with the PROFILECORRECT™ system 140. For example, the user may do this by submitting documentation (e.g., a birth certificate, a driver's license, a passport, etc.) that verifies the user's identity, as well as optional credentials (such as degrees, certifications, and/or the like). The documentation and/or the optional credentials may be received by the PROFILECOMMENTARY™ engine 142. The PROFILECOMMENTARY™ engine 142 may make the documentation and/or optional credentials available to an administrator user or other worker of an entity that operates the PROFILECORRECT™ system 140 so that the administrator user or other worker can verify the authenticity of the user and his or her credentials based on the submitted documentation and/or optional credentials.

At step two, once the PROFILECOMMENTARY™ engine 142 has verified the user's credentials, the PROFILECOMMENTARY™ engine 142 can send a registration code to the user system 110. The user may have to request the registration code explicitly so that the user can supply the registration code to a content site 130. The registration code may be unique for each content site 130 for which the user wishes to create a new profile. The registration code may also be valid until the content site 130 passes the registration code to the PROFILECORRECT™ system 140 and it is validated, the user generates another registration code associated with the content site 130, or a time period has passed since the registration code was generated (e.g., 60 minutes).

Steps one and two may be performed while the user is logged into the PROFILECORRECT™ system 140. The PROFILECORRECT™ system 140 may implement various security and authentication features to ensure that the information provided by the user (e.g., username, password, credentials, etc.) and the information transmitted to the user system 110 by the PROFILECORRECT™ system 140 (e.g., the registration code) are securely transferred. For example, when the user logs into the PROFILECORRECT™ system 140, the user may provide a username (e.g., a user ID) and a password (e.g., using a security assertion markup language (SAML) protocol). The user ID and/or password may be encrypted (e.g., using SHA-256). If the user ID and password cannot be authenticated after several attempts (e.g., 3, 4, 5, etc.), then the user ID may be disabled. Furthermore, if the user ID is associated with simultaneously open processes at multiple locations or is inactive for a period of time (e.g., 30 continuous days), the user ID may be disabled. In addition, the password may be disabled if used for longer than a period of time (e.g., 30 continuous days). If the user ID and password can be authenticated, the PROFILECORRECT™ system 140 may store the user ID for the duration of the user's session. The user, via the browser application of the user system 110, may communicate with the PROFILECORRECT™ system 140 during the open session (e.g., to modify the content of a badge) and such communications may include a user ID. However, the PROFILECORRECT™ system 140 may ignore the user ID provided by the user system 110 after the user logs in. Rather, the PROFILECORRECT™ system 140 may continue to use the user ID initially received at the beginning of the session to perform any operations. Thus, even if a communication from the user system 110 was intercepted and spoofed such that the user ID identified in the communication was replaced with another user ID (e.g., so that a malicious entity could receive confidential information of the user associated with the other user ID), the PROFILECORRECT™ system 140 would not perform any operations related to the account of the user associated with the other user ID. Moreover, the open session may be terminated if the user is inactive for a period of time (e.g., 15 minutes, 30 minutes, etc.).

At step three, once the user has the registration code, the user may create a new profile with the content site 130 (which may be an e-mail server, real estate site, dating site, social media site, gaming site, transaction site, and/or the like as described above). As part of this profile creation process, the user system 110 can supply the registration code obtained from the PROFILECOMMENTARY™ engine 142.

The content site 130 may be affiliated with the PROFILECORRECT™ system 140. For example, the content site 130 may have created a profile or otherwise registered with the PROFILECORRECT™ system 140. At step four, because the content site 130 may be affiliated with the PROFILECORRECT™ system 140, the content site 130 may be allowed to request verification of a user's identity and/or credentials over a secure channel (e.g., via the SAML protocol). The user validation service 144 may receive this request. In this step, the content site 130 can supply the registration code supplied by the user system 110 and may also supply a partner code unique to the content site 130. The user validation service 144 can use the registration code and the partner code to verify the user's identity and/or credentials and the identity of the content site 130. For example, the user validation service 144 may verify the user's identity and/or credentials by accessing a user profile associated with the registration code stored in the PROFILECORRECT™ database 146 and determining whether verified credentials are stored in association with the user profile.

In an embodiment, the PROFILECORRECT™ system 140 authenticates the request before allowing the user validation service 144 to perform any operations. For example, during the registration process, the PROFILECORRECT™ system 140 may provide the content site 130 with a key (e.g., a shared key). The key may be unique to the content site 130. For each request transmitted to the PROFILECORRECT™ system 140, the content site 130 may use the key to generate a signature (e.g., a hash string) of an identity of the content site 130 and a time when the request is submitted, and the signature may be included in the request. The signature may be generated according to the SAML protocol. Upon receiving the request, the PROFILECORRECT™ system 140 may use the key associated with the content site 130 to generate a signature of the identity of the content site 130 and a time when the request was submitted. If the signature generated by the PROFILECORRECT™ system 140 matches the signature included in the request, then the request is authenticated and the components or modules of the PROFILECORRECT™ system 140 can respond to the request. If the signature generated by the PROFILECORRECT™ system 140 does not match the signature included in the request (e.g., because an entity is maliciously spoofing the content site 130 and using a different key to generate the signature), then the PROFILECORRECT™ system 140 may prevent its components or modules from responding to the request. As another example, the content site 130 provides a secure sockets layer (SSL) or transport layer security (TSL) certificate so that the PROFILECORRECT™ system 140 can perform the authentication of the content site 130. The certificate may be used to exchange a session key between the content site 130 and the PROFILECORRECT™ system 140 that can be used to encrypt data communicated between the two entities.

At step five, if the user profile is associated with verified credentials, then the user validation service 144 can transmit a verification message to the content site 130. The verification message may be a positive acknowledgment that the user's identity and/or credentials are verified (e.g., the verification message may not include the content of a PROFILECOMMENTARY™ profile). The verification message may further include a badge that can be included on the content site 130. However, if the registration code does is not associated with a user profile, the partner code is not associated with a content site 130 affiliated with the PROFILECORRECT™ system 140, and/or the user profile is not associated with any verified credentials, then the user validation service 144 can transmit a message to the content site 130 indicating that the user's identity and/or credentials cannot be authenticated or verified (e.g., a negative acknowledgment that the user's identity and/or credentials are not verified).

At step six, the content site 130 can display a badge or other indicia together with the user's profile so that other users of the content site 130 can see that the user has been verified (see, e.g., FIG. 6 below). In one embodiment, other users of the content site 130 can select the badge (e.g., by clicking, tapping, or hovering over the badge with a mouse pointer, using voice commands, etc.) to view aspects of the user that have been verified. As described above, these aspects may be called a "PROFILECOMMENTARY™ profile," and the particular aspects shown in the PROFILECOMMENTARY™ profile can be selected by the user via the PROFILECOMMENTARY™ engine 142, as will be described in greater detail below with respect to FIGS. 4-5.

Figure 2B:
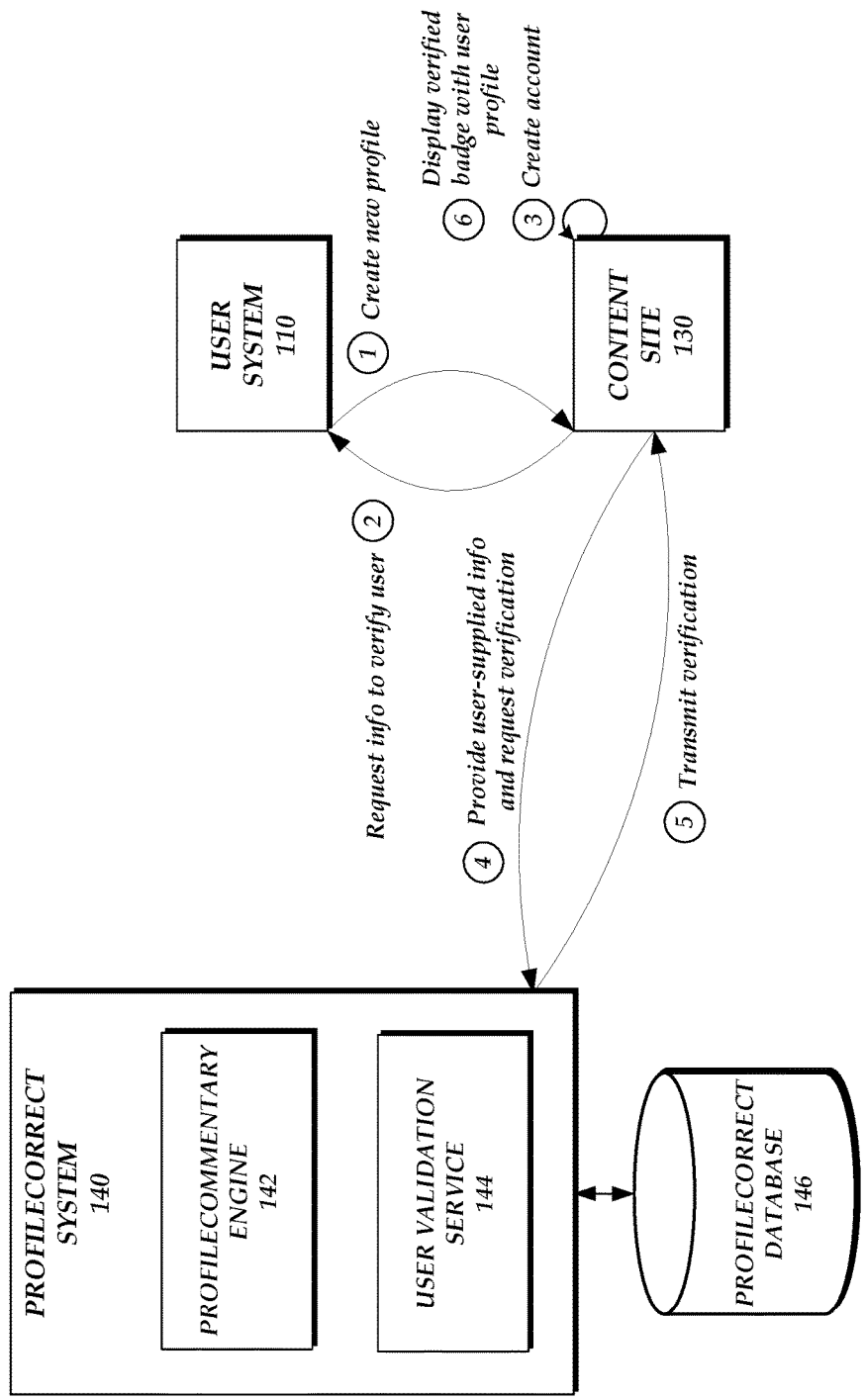
FIG. 2B illustrates another example process for performing user verification.

FIG. 2B illustrates another example process for performing user verification. As illustrated in FIG. 2B, the user may not need to first create an account or otherwise verify himself or herself with the PROFILECORRECT™ system 140 before establishing a new, verified profile with the content site 130. Instead, as illustrated in FIG. 2B, the content site 130 can integrate the PROFILECORRECT™ system 140 functionality into the new account registration process. This integration may be seamless to the user.

At step one, the user may begin creating a new profile with the content site 130. Creation of the new profile may include selecting a username and a password and/or providing information regarding the identity of the user (e.g., the user's name, address, age, gender, height, education, employer, employment status, hobbies, interests, citizenship, etc.).

At step two, the content site 130 may request information to verify the user's identity and/or credentials. For example, the request may be transmitted to the user system 110.

At step three, the content site 130 can create an account for the user using the information provided by the user. The content site 130 may provide a confirmation to the user system 110 that the account has been created.

At step four, the content site 130 may provide the user-supplied information to the user validation service 144 for verification. In some embodiments, the content site 130 selects some or all of the user-supplied information to be verified. In other embodiments, the user, via the user system 110, can select which of the user-supplied information to be verified and which of the user-supplied information the user does not want verified.

At step five, the user validation service 144 can perform the verification (as described above) and transmit the verification (or a message indicating that verification failed) to the content site 130. At step six, the content site 130 can then display a badge with the user profile, similar to the badge described above.

Example PROFILECOMMENTARY™ Profile User Interfaces

Figure 3:
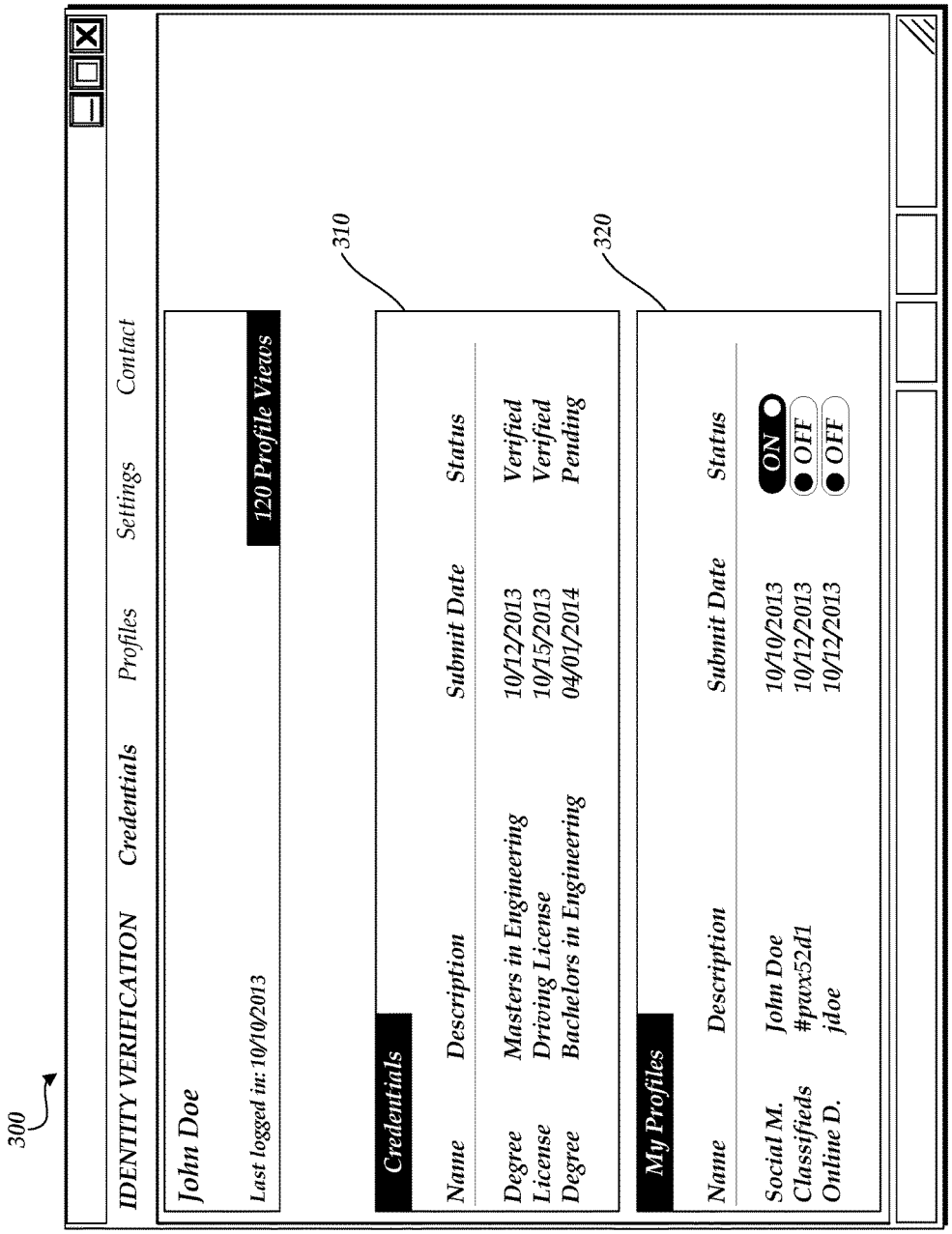
FIG. 3 illustrates an example interactive user interface that depicts a dashboard that enables users of the PROFILECORRECT™ system to manage their user profile.

FIG. 3 illustrates an example interactive user interface 300 that depicts a dashboard that enables users of the PROFILECORRECT™ system 140 to manage their user profile. For example, the dashboard may provide functionality for a user to manage the content of badges or profile commentaries shown on the content sites 130.

In box 310, the interactive user interface 300 displays a list of user credentials that have been verified and that are pending verification. In addition, the box 310 may provide the user with the ability to add additional credentials for verification.

In box 320, the interactive user interface 300 displays a list of profiles created by the user on various content sites 130. For example, the user may have created an account with a social media site, with a classifieds site (e.g., a transaction site), and an online dating site. The box 320 may further indicate the date that the profiles were created and a status of each profile. The status may indicate whether the content site 130 associated with the profile has been granted access by the user to an indication of what user credentials are verified. For example, the social media site account is "on." Thus, the social media site may contact the PROFILECORRECT™ system 140 and receive an indication of what user credentials are verified for the user John Doe. This indication may be in the form of a badge or PROFILECOMMENTARY™ profile that may then be accessible by other users of the social media site. The classifieds site and the online dating site, however, are "off." Thus, the classifieds site and the online dating site may be denied access by the PROFILECORRECT™ system 140 to the indication of what user credentials are verified for the user #pwx52d1 and jdoe, respectively. In addition, the box 320 may provide the user with the ability to add sites to the list of created profiles.

The interactive user interface 300 may further allow the user to track registration codes by indicating what registration codes have been used by the user at the various content sites 130. For example, the interactive user interface 300 may identify the registration code, the content site 130 at which the registration code was used, and the date that the registration code was used. The user may further use the interactive user interface 300 to request new registration codes for various content sites 130.

FIG. 4 illustrates an example interactive user interface 400 that may be generated by the PROFILECORRECT™ system 140, in which a user may select what information related to the user may be shown in a badge or when a badge is selected by other users. For example, a user may use the interactive user interface 400 to customize a PROFILECOMMENTARY™ profile for each content site 130 for which the user has a verified profile.

For instance, a user may wish to have a detailed PROFILECOMMENTARY™ profile that shows verified credentials for all the user's degrees and certifications on a social media site like LINKEDIN®, where professional certifications and credentials are commonly included in a profile. In contrast, on a dating site, this information may be less relevant, or at least the user may not wish to share this information in his or her profile.

As illustrated in FIG. 4, the user can select a content site 130 in drop down box 410. In area 420, the user may then select which aspects of the user are to be included in the PROFILECOMMENTARY™ profile associated with the selected content site 130. Such selections can include an identity of the user, the user's address, the user's educational background, and/or the like. The user can repeat this process for any number of content sites 130.

FIG. 5 illustrates an interactive user interface 500 that enables a user to completely enable, disable, edit, and/or delete a PROFILECOMMENTARY™ profile for a particular content site 130. For example, after selecting which aspects of the user are to be included in the PROFILECOMMENTARY™ profile associated with a given content site 130, the user can select whether the PROFILECOMMENTARY™ profile is enabled or disabled for the respective content site 130. Disabling a PROFILECOMMENTARY™ profile may not remove a badge from the respective content site 130. Rather, when selecting the badge, the selecting entity may receive a notification that the PROFILECOMMENTARY™ profile is not available for viewing (e.g., the badge may be a broken link). If the user elects to edit a PROFILECOMMENTARY™ profile, the user may be redirected to the interactive user interface 400. If the user elects to delete a PROFILECOMMENTARY™ profile, the listing of the respective content site 130 may be removed from the interactive user interface 500 and/or a badge on a content site 130 may be removed.

Figure 6:
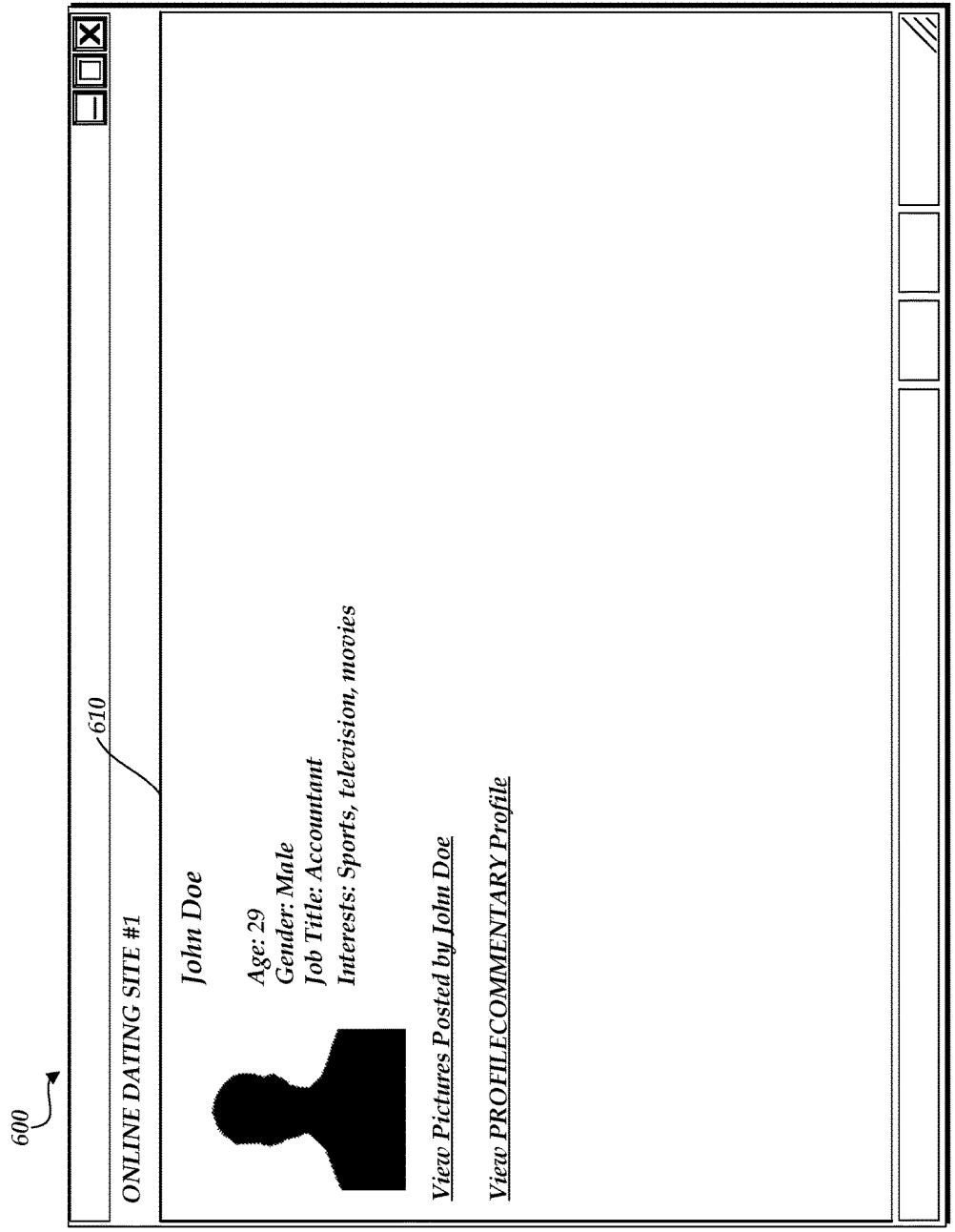
FIG. 6 illustrates an interactive user interface that shows an example badge that may be displayed on a content site.

FIG. 6 illustrates an interactive user interface 600 that shows an example badge 610 that may be displayed on a content site 130. As illustrated in FIG. 6, the badge 610 may include a photo of the user associated with the badge 610, an age of the user, the user's gender, the user's occupation, the user's interests or hobbies, a link to view additional photos posted by the user, and/or a link to view the user's PROFILECOMMENTARY™ profile. While a specific link to view the PROFILECOMMENTARY™ profile is shown, this is not meant to be limiting. The badge 610 itself may be a link that redirects the selecting entity to the PROFILECOMMENTARY™ profile.

Figure 7:
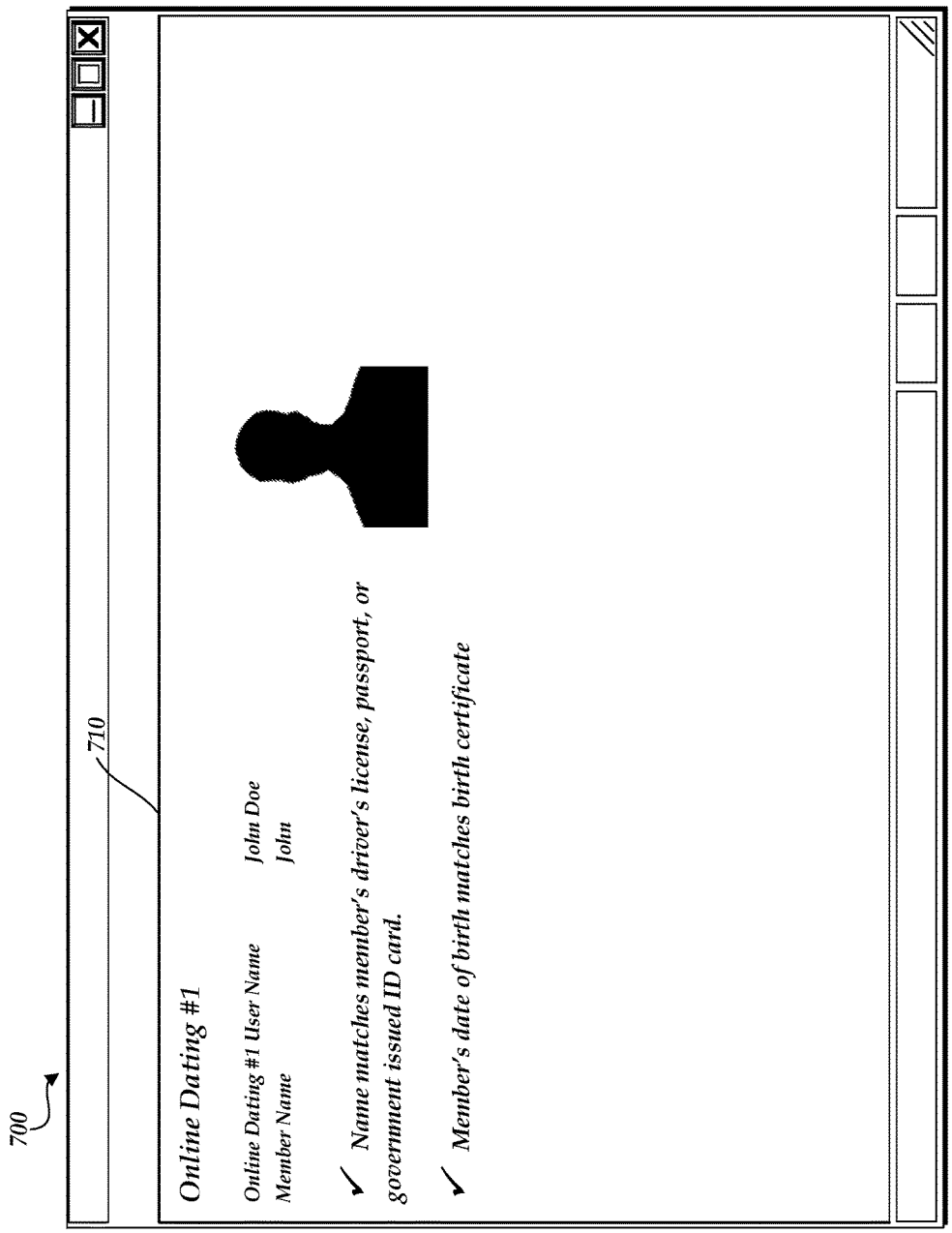
FIG. 7 illustrates an interactive user interface that shows an example PROFILECOMMENTARY™ profile shown on a content site when a user selects a badge, such as the badge of FIG. 6.

FIG. 7 illustrates an interactive user interface 700 that shows an example PROFILECOMMENTARY™ profile 710 shown on a content site 130 when a user selects a badge, such as the badge 610 of FIG. 6. As shown, the PROFILECOMMENTARY™ profile 710 may include the user's photo and indicates that the user's name is verified and that the user's date of birth is verified, but no credentials are shown as being verified. The user may have submitted documentation to the PROFILECORRECT™ system 140 to verify his or her credentials, but the user may have elected not to include the indication of the verified credentials in the PROFILECOMMENTARY™ profile 710. The user may modify the PROFILECOMMENTARY™ profile 710 via the interactive user interfaces 400 and 500 described above. The PROFILECOMMENTARY™ profile 710 may further identify the content site 130 that the PROFILECOMMENTARY™ profile 710 is associated with or from which the selecting entity was redirected from.

Figure 8A:
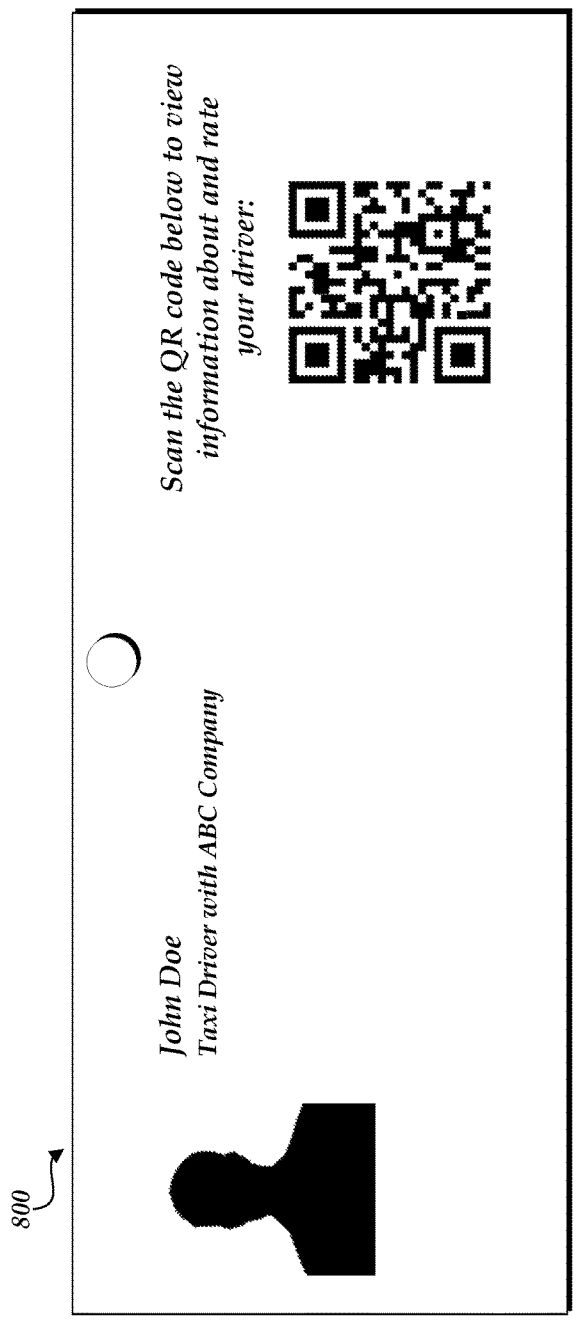
FIG. 8A illustrates a physical badge that may be located near or at a user's place of business.

FIG. 8A illustrates a physical badge 800 that may be located near or at a user's place of business. In some embodiments, the physical badge 800 is located near or at a place of business where a user provides a service. For example, if the user is a taxi driver, the physical badge 800 may be posted in the user's taxi. The physical badge 800 may include a photo of the user, the user's name, the user's occupation and place of employment, and a unique identifier. The unique identifier may be a barcode (e.g., a universal product code (UPC), a quick response (QR) code, etc.), a near field communication (NFC) tag, a radio-frequency identification (RFID) tag, and/or the like. When scanned by an electronic device, such as a mobile phone, an NFC scanner, and RFID scanner, and/or the like, the unique identifier may cause the electronic device to be redirected to and display a PROFILECOMMENTARY™ profile associated with the user.

Figure 8B:
FIG. 8B illustrates an example interactive user interface that depicts a PROFILECOMMENTARY™ profile that is displayed in response to the scanning of a physical badge, such as the physical badge of FIG. 8A.

FIG. 8B illustrates an example interactive user interface 850 that depicts a PROFILECOMMENTARY™ profile 860 that is displayed in response to the scanning of a physical badge, such as the physical badge 800 of FIG. 8A. The PROFILECOMMENTARY™ profile 860 may allow the user that scanned the unique identifier to view verified aspects of the user associated with the physical badge 800 (e.g., the user's photo, the user's name, the user's occupation and place of employment, the user's age, etc.). The PROFILECOMMENTARY™ profile 860 may also allow the user that scanned the unique identifier to rate the user associated with the physical badge 800, complete a survey related to the user associated with the physical badge 800 (e.g., related to the services provided by the user associated with the physical badge 800), and/or provide any related comments. Thus, the physical badge 800 can be used by an employer to provide verified employee information to its customers and allow the customers to provide real-time feedback on the employees (e.g., via a rating, a survey, etc.).

Example Process for Customizing a PROFILECOMMENTARY™ Profile

Figure 9:
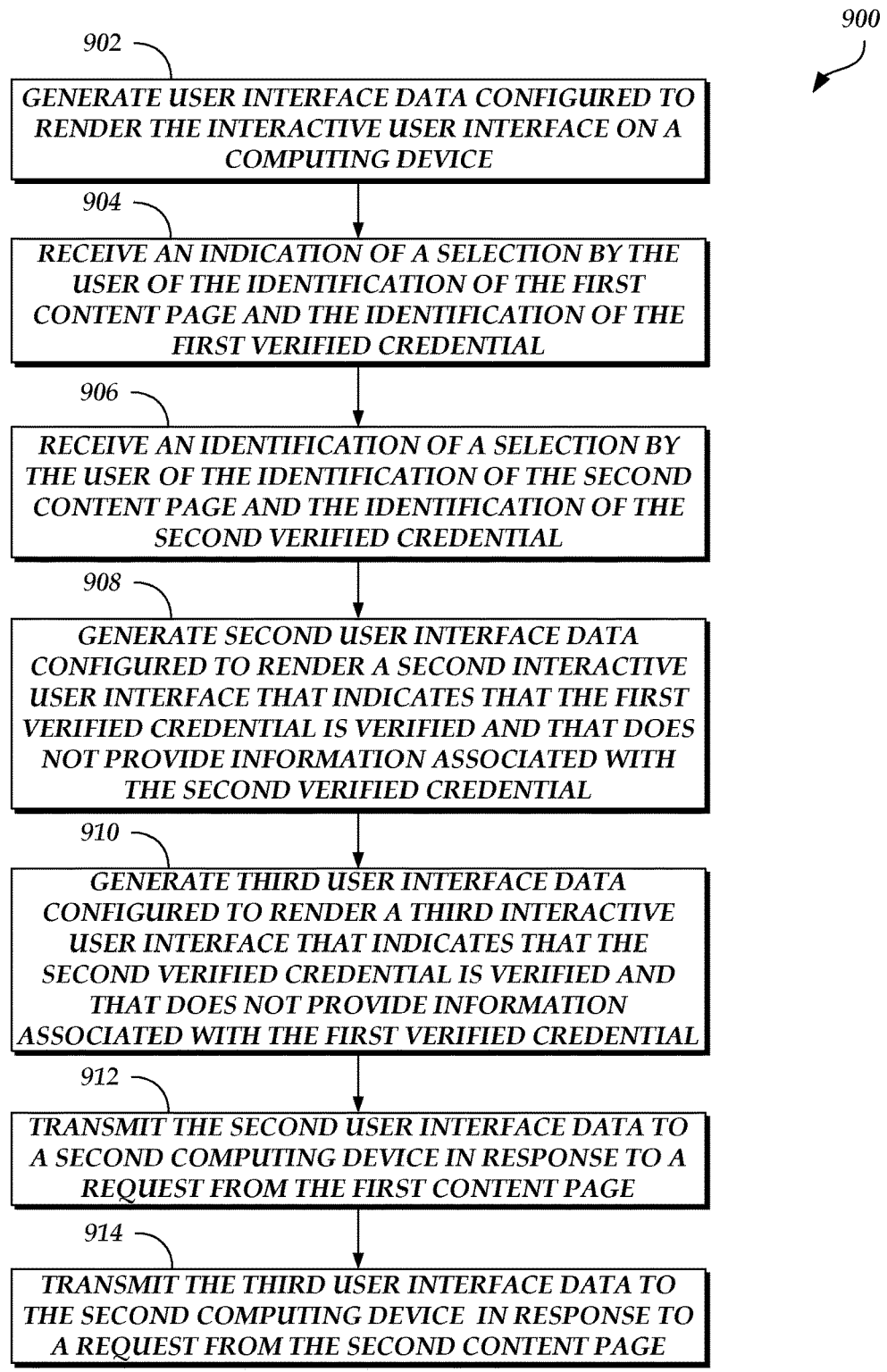
FIG. 9 illustrates a process for customizing a PROFILECOMMENTARY™ profile.

FIG. 9 illustrates a process 900 for customizing a PROFILECOMMENTARY™ profile. As an example, the PROFILECORRECT™ system 140 of FIGS. 1-2B can be configured to execute the process 900. The process 900 begins at block 902.

At block 902, user interface data configured to render an interactive user interface on a computing device is generated. The user interface data may include an identification of a first content page, an identification of a second content page, an identification of a first verified credential, and an identification of a second verified credential. Any of the identified information included in the user interface data may be selectable by a user. For example, the content pages may be pages generated by different content sites 130.

At block 904, an indication of a selection by the user of the identification of the first content page and the identification of the first verified credential is received. For example, the user may select a page associated with a social media site and may select verified education credentials.

At block 906, an indication of a selection by the user of the identification of the second content page and the identification of the second verified credential may be received. For example, the user may select a page associated with a dating site and may select verified identity credentials (e.g., the user's name and age).

At block 908, second user interface data may be generated configured to render a second interactive user interface that indicates that the first verified credential is verified and that does not provide information associated with the second verified credential. For example, the second interactive user interface may be a PROFILECOMMENTARY™ profile associated with the social media site that only indicates that the user's education credentials are verified (and not that the user's identity is also verified).

At block 910, third user interface data may be generated configured to render a third interactive user interface that indicates that the second verified credential is verified and that does not provide information associated with the first verified credential. For example, the third interactive user interface may be a PROFILECOMMENTARY™ profile associated with the dating site that only indicates that the user's identity credentials are verified (and not that the user's education credentials are also verified).

At block 912, the second user interface data is transmitted to a second computing device in response to a request from the first content page. For example, if another user of the social media site selects a badge associated with the user, the other user may be redirected to and view the user's PROFILECOMMENTARY™ profile as customized for the social media site.

At block 914, the third user interface data is transmitted to the second computing device in response to a request from the second content page. For example, if another user of the dating site selects a badge associated with the user, the other user may be redirected to and view the user's PROFILECOMMENTARY™ profile as customized for the dating site.

Terminology

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The user interfaces shown herein include one or more user interface controls that can be selected by a user, for example, using a browser or other application software. Thus, the user interface shown may be output for presentation by the application, which may optionally include a browser or any other application software. The user interface controls shown are merely illustrative examples and can be varied in other embodiments. For instance, buttons, dropdown boxes, select boxes, text boxes, check boxes, slider controls, and other user interface controls shown may be substituted with other types of user interface controls that provide the same or similar functionality. Further, user interface controls may be combined or divided into other sets of user interface controls such that similar functionality or the same functionality may be provided with very different looking user interfaces. Moreover, each of the user interface controls may be selected by a user using one or more input options, such as a mouse, touch screen input, or keyboard input, among other user interface input options. Although each of these user interfaces are shown implemented in a mobile device, the user interfaces or similar user interfaces can be output by any computing device, examples of which are described above. The user interfaces described herein may be graphical user interfaces generated electronically by the application.

It is to be understood that not necessarily all such advantages can be achieved in accordance with any particular embodiment of the embodiments disclosed herein. Thus, the embodiments disclosed herein can be embodied or carried out in a manner that achieves or optimizes one advantage or group of advantages as taught herein without necessarily achieving other advantages as may be taught or suggested herein.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a hardware processor or digital logic circuitry, which may be or include a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry or digital logic circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a device controller, or a computational engine within an appliance, to name a few.

The steps of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC.

Conditional language used herein, such as, among others, can, might, may, e.g., and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms comprising, including, having, and the like are synonymous and are used inclusively, in an open-ended fashion, and do not exclude additional elements, features, acts, operations, and so forth. Also, the term or is used in its inclusive sense (and not in its exclusive sense) so that when used, for example, to connect a list of elements, the term or means one, some, or all of the elements in the list. Further, the term each, as used herein, in addition to having its ordinary meaning, can mean any subset of a set of elements to which the term each is applied.

Disjunctive language such as the phrase at least one of X, Y and Z, unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

Unless otherwise explicitly stated, articles such as a or an should generally be interpreted to include one or more described items. Accordingly, phrases such as a device configured to are intended to include one or more recited devices. Such one or more recited devices can also be collectively configured to carry out the stated recitations. For example, a processor configured to carry out recitations A, B and C can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A computing system configured to authenticate an identity of a user, the computing system comprising:
   a computer processor;
   a database storing a plurality of verified credentials associated with a user; and
   a computer readable storage medium storing program instructions configured for execution by the computer processor in order to cause the computing system to:
      access user interface data configured to render an interactive user interface on a computing device, the interactive user interface including an identification of a first content page and an identification of a first verified credential in the plurality of verified credentials, wherein the first verified credential comprises first aspect data representing a first verified detail of the user and second aspect data representing a second verified detail of the user;
      receive first user authentication data associated with the user;
      transmit the user interface data to the computing device in response to a determination that the first user authentication data is authenticated;
      store the first user authentication data;
      receive different user authentication data and an indication that the first content page is selected and that the first aspect data is selected to be publicly viewable;
      in response to receiving the different user authentication data and the indication that the first content page and the first aspect data are selected:
         ignore the different user authentication data and retrieve the first user authentication data, and
         access second user interface data configured to render a second interactive user interface using the first user authentication data, wherein the second interactive user interface includes the first aspect data and not the second aspect data; and
      transmit, in response to a request from the first content page, the second user interface data to a second computing device.

2. The computing system of claim 1, wherein the interactive user interface further includes an identification of a second content page, and wherein the computer readable storage medium further stores program instructions that cause the computing system to:
   receive third user authentication data and an indication that the second content page and the second aspect data are selected;
   in response to receiving the third user authentication data and the indication that the second content page and the second aspect data are selected:
      ignore the third user authentication data and retrieve the first user authentication data, and
      access third user interface data configured to render a third interactive user interface using the first user authentication data, wherein the third interactive user interface includes the second aspect data and not the first aspect data; and
   transmit, in response to a request from the second content page, the third user interface data to the second computing device.

3. The computing system of claim 1, wherein the computer readable storage medium further stores program instructions that cause the computing system to:
   receive an indication that the first content page and the second aspect data are selected; and
   update the second user interface data such that the second interactive user interface includes the first aspect data and the second aspect data.

4. The computing system of claim 1, wherein the first verified credential comprises a photo identification provided by the user.

5. The computing system of claim 1, wherein the first aspect data comprises a name of the user, and wherein the second aspect data comprises an address of the user.

6. The computing system of claim 1, wherein the computer readable storage medium further stores program instructions that cause the computing system to:
   receive an indication that the first content page is selected and that the first verified credential is de-selected; and
   update the second user interface data such that the second interactive user interface does not include information associated with the first verified credential.

7. The computing system of claim 1, wherein the computer readable storage medium further stores program instructions that cause the computing system to:
   receive an indication that the first content page is de-selected; and
   prevent, in response to a request from the first content page, transmission of the second user interface data.

8. The computing system of claim 1, wherein the computer readable storage medium further stores program instructions that cause the computing system to determine whether the request from the first content page can be authenticated.

9. The computing system of claim 8, wherein the computer readable storage medium further stores program instructions that cause the computing system to generate a hash value based on a value associated with the first content page, a time that the request from the first content page is received, and a shared key.

10. The computing system of claim 9, wherein the request from the first content page comprises a second hash value, and wherein the computer readable storage medium further stores program instructions that cause the computing system to authenticate the request from the first content page if the hash value matches the second hash value.

11. The computing system of claim 8, wherein the request from the first content page is transmitted using one of a security assertion markup language protocol or a secure sockets layer protocol.

12. The computing system of claim 1, wherein the second interactive user interface further includes a rating of the user.

13. The computing system of claim 1, wherein the first content page is one of a page providing real estate information, a social media page, or an online dating page.

14. A computer-implemented method of authenticating an identity of a user, the computer-implemented method comprising:
   by execution of program instructions by one or more computing devices:
      accessing user interface data configured to render an interactive user interface on a user device, the interactive user interface including an identification of a first content page and an identification of a first verified credential in a plurality of verified credentials, wherein the first verified credential comprises first aspect data representing a first aspect of the user and second aspect data representing a second aspect of the user;

receiving first user authentication data associated with the user;

transmitting the user interface data to the user device in response to a determination that the first user authentication data is authenticated;

storing the first user authentication data;

receiving second user authentication data and an indication that the first content page and the first aspect data are selected;

in response to receiving the second user authentication data and the indication that the first content page and the first aspect data are selected:
  ignoring the second user authentication data and retrieving the first user authentication data, and
  accessing second user interface data configured to render a second interactive user interface using the first user authentication data, wherein the second interactive user interface includes the first aspect data and not the second aspect data; and transmitting, in response to a request from the first content page, the second user interface data to a second user device.

15. The computer-implemented method of claim 14, wherein the interactive user interface further includes an identification of a second content page, the computer-implemented method further comprising:

receiving third user authentication data and an indication that the second content page and the second aspect data are selected;

in response to receiving the third user authentication data and the indication that the second content page and the second aspect data are selected:
  ignoring the third user authentication data and retrieving the first user authentication data, and
  accessing third user interface data configured to render a third interactive user interface using the first user authentication data, wherein the third interactive user interface includes the second aspect data and not the first aspect data; and transmitting, in response to a request from the second content page, the third user interface data to the second user device.

16. The computer-implemented method of claim 14, further comprising:

receiving an indication that the first content page and the second aspect data are selected; and updating the second user interface data such that the second interactive user interface includes the first aspect data and the second aspect data.

17. The computer-implemented method of claim 14, wherein the first verified credential comprises a photo identification provided by the user.

18. The computer-implemented method of claim 14, wherein the first aspect data comprises a name of the user, and wherein the second aspect data comprises an address of the user.

19. The computer-implemented method of claim 14, further comprising:

receiving an indication that the first content page is selected and that the first verified credential is de-selected; and updating the second user interface data such that the second interactive user interface does not include information associated with the first verified credential.

20. The computer-implemented method of claim 14, wherein the second interactive user interface further includes a rating of the user.

* * * * *